(12) United States Patent  
Craven-Bartle

(10) Patent No.: US 8,548,317 B2  
(45) Date of Patent: Oct. 1, 2013

(54) DIFFERENT ASPECTS OF ELECTRONIC PENS

(75) Inventor: Thomas Craven-Bartle, Lund (SE)

(73) Assignee: Anoto AB, Lund (SE)

(*) Notice: Subject to any disclaimer, the term of this patent is extended or adjusted under 35 U.S.C. 154(b) by 260 days.

(21) Appl. No.: 12/593,401

(22) PCT Filed: Mar. 26, 2008

(86) PCT No.: PCT/SE2008/050335  
§ 371 (c)(1),  
(2), (4) Date: Sep. 28, 2009

(87) PCT Pub. No.: WO2008/118085  
PCT Pub. Date: Oct. 2, 2008

(65) Prior Publication Data  
US 2010/0085471 A1    Apr. 8, 2010

Related U.S. Application Data

(60) Provisional application No. 60/907,318, filed on Mar. 28, 2007.

(30) Foreign Application Priority Data

Mar. 28, 2007  (SE) ...................................... 0700785

(51) Int. Cl.  
*G03B 15/03* (2006.01)

(52) U.S. Cl.  
USPC .......................................................... 396/155

(58) Field of Classification Search  
USPC .......................................................... 396/155  
See application file for complete search history.

(56) References Cited

U.S. PATENT DOCUMENTS

| 6,452,683 | B1 | 9/2002 | Kinrot et al. |
| 6,663,008 | B1 | 12/2003 | Pettersson et al. |

(Continued)

FOREIGN PATENT DOCUMENTS

| JP | 5-25887 | 4/1993 |
| JP | 8-101739 | 4/1996 |

(Continued)

OTHER PUBLICATIONS

International Search Report PCT2004/077107 A3 of International Application No. PCT2004/077107 A2, dated Oct. 9, 2004.

(Continued)

*Primary Examiner* — Rochelle-Ann J Blackman  
*Assistant Examiner* — Linda B Smith  
(74) *Attorney, Agent, or Firm* — Finnegan, Henderson, Farabow, Garrett & Dunner, L.L.P.

(57) ABSTRACT

A miniaturized optical component (36) for a camera pen has the shape of a plate and comprises at least two non-overlapping radiation-transmitting sections: an imaging section (36') configured to transmit an image of an object plane, and an illuminating section (36") configured to transmit illuminating radiation towards the object plane. Passive optical elements may be incorporated in the component to provide the imaging and illuminating sections, e.g. an image-generating surface structure, an illumination-controlling surface structure, a radiation filter, a stray light shield, and an aperture stop. These optical elements may be provided as well-defined surface structures and layers on a plate substrate. The optical component may be manufactured as a wafer structure comprising a plurality of these optical components. A camera housing (22) may be provided with a first mounting structure (56) for the optical component (36), a second mounting structure (64) for an image sensor (11) configured to detect the image, and a third mounting structure (66) for a radiation source (13) configured to generate the illuminating radiation. An elongate guide pipe (24) for receiving a stylus (8) may be received in and joined to an elongate recess (28) in an exterior wall portion of the camera housing (22).

20 Claims, 9 Drawing Sheets

(56) References Cited

U.S. PATENT DOCUMENTS

| | | |
|---|---|---|
| 6,665,490 B2 | 12/2003 | Copperman et al. |
| 6,929,183 B2 | 8/2005 | Pettersson |
| 6,985,643 B1 | 1/2006 | Fåhraeus et al. |
| 7,050,653 B2 | 5/2006 | Edsö et al. |
| 7,438,443 B2 * | 10/2008 | Tatsuno et al. ............... 362/297 |
| 8,247,758 B2 * | 8/2012 | Lum et al. ............... 250/231.18 |
| 2002/0048404 A1 | 4/2002 | Fahraeus et al. |
| 2003/0075673 A1 | 4/2003 | Craven-Bartle |
| 2004/0086181 A1 | 5/2004 | Wang et al. |
| 2004/0179000 A1 * | 9/2004 | Fermgard et al. ............ 345/179 |
| 2005/0002113 A1 | 1/2005 | Berge |
| 2005/0030297 A1 | 2/2005 | Burstrom et al. |
| 2005/0156915 A1 | 7/2005 | Fisher |
| 2006/0126190 A1 | 6/2006 | Berge et al. |
| 2006/0152814 A1 | 7/2006 | Peseux |
| 2007/0025805 A1 | 2/2007 | Lapstun et al. |
| 2007/0127914 A1 * | 6/2007 | Chang .......................... 396/505 |
| 2007/0206124 A1 * | 9/2007 | Lee .............................. 348/836 |
| 2008/0316562 A1 * | 12/2008 | Sanders et al. ................ 359/212 |
| 2009/0140656 A1 * | 6/2009 | Kohashikawa et al. ....... 315/151 |

FOREIGN PATENT DOCUMENTS

| | | |
|---|---|---|
| JP | 11-290269 | 10/1999 |
| JP | 2004-152269 | 5/2004 |
| JP | 2004-535010 | 11/2004 |
| WO | WO 02/103451 A1 | 12/2002 |
| WO | WO 03/001358 | 1/2003 |
| WO | WO 03/069380 A1 | 8/2003 |
| WO | WO 03/069547 A1 | 8/2003 |
| WO | WO 2004/077107 A2 | 9/2004 |
| WO | WO 2005/057471 A1 | 6/2005 |
| WO | WO 2006/006925 A1 | 1/2006 |

OTHER PUBLICATIONS

International Search Report from the Swedish Patent Office in International Application No. PCT/SE2008/050335, dated Sep. 17, 2008.

* cited by examiner

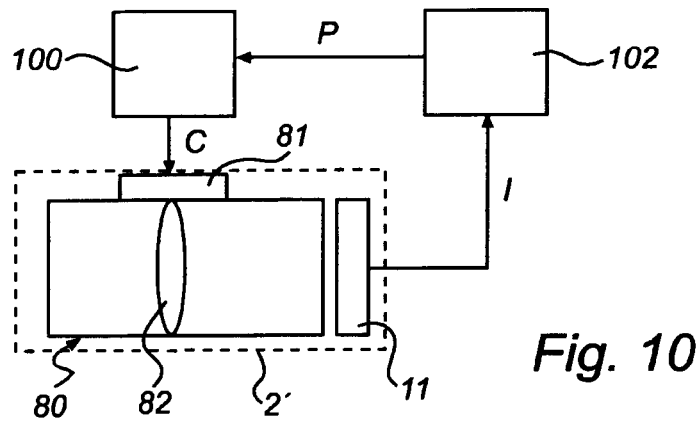
Fig. 10
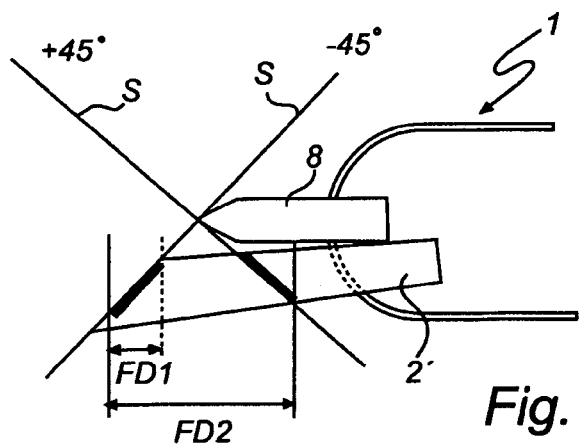
Fig. 11
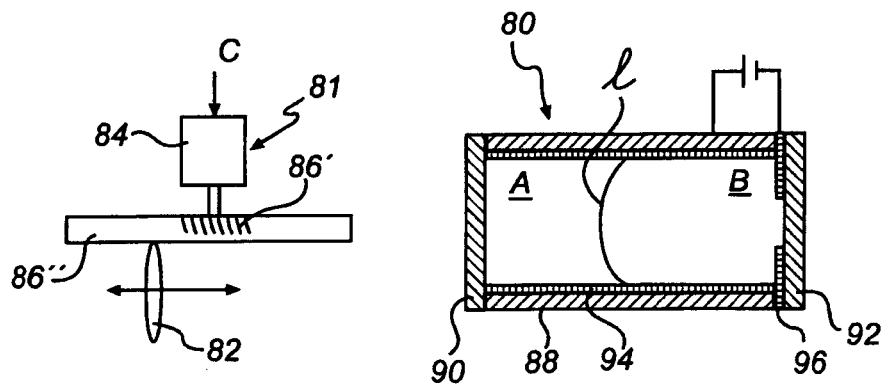
Fig. 12a
Fig. 12b

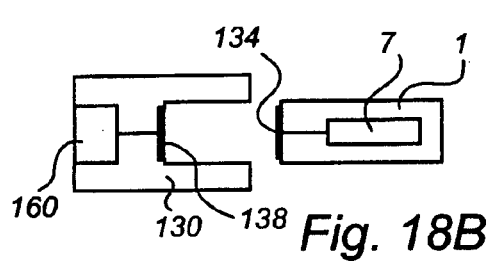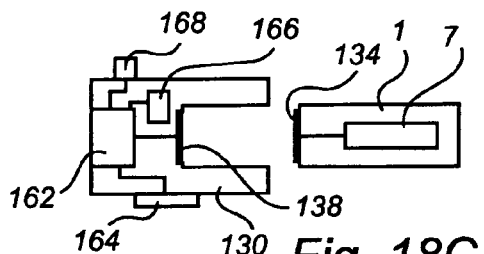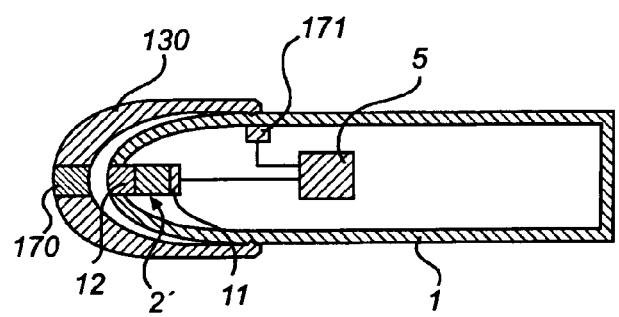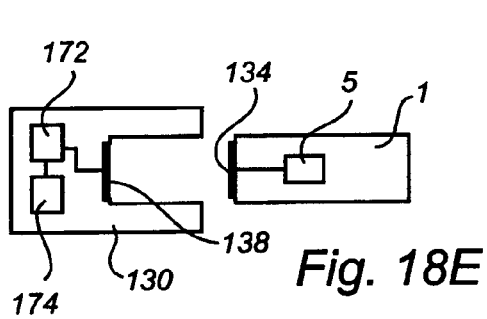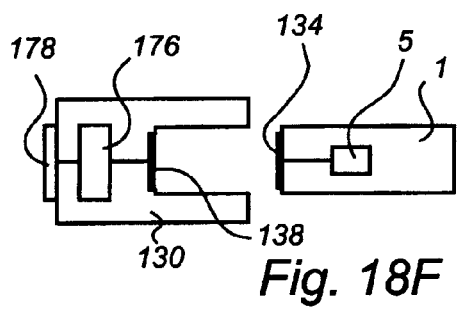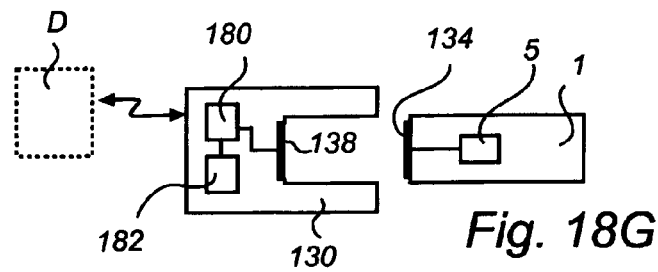

they are expected to deliver a given number of pages per year. One solution to this problem would be to provide the user with extra ink cartridges or the like, but this often results in a plurality of ink cartridges being left unused with the user. There is thus a need to facilitate the replenishment of a consumable in an electronic pen.

DIFFERENT ASPECTS OF ELECTRONIC PENS

CROSS-REFERENCE TO RELATED APPLICATIONS

This application is a national stage of PCT/SE08/50335 filed on Mar. 26, 2008 which claims benefit of U.S. provisional patent application No. 60/907,318 filed on Mar. 28, 2007 and Swedish patent application no. 0700785-9, filed on Mar. 28, 2007, and both of which are hereby incorporated by reference.

FIELD OF THE INVENTION

The present invention relates to improvements in electronic pens in general, and to camera pens in particular.

BACKGROUND OF THE INVENTION

Camera pens are known to include a miniaturized camera for capturing images of a product surface, see e.g. US2004/0179000, WO2005/057471 and US2003/0075673.

Generally, the camera is designed as a package of a large number of separate components, such as a CCD sensor, one or more imaging lenses, an aperture stop, a radiation filter, an illuminating LED, optics for redirecting/shaping the illuminating radiation emitted from the LED, etc. Since these components are both numerous and small, assembly work may be difficult and time-consuming. Further, the camera may need to be designed with strict assembly tolerances to avoid problems with tolerance stack-up. There is thus a need for a camera design that is simple to assemble with high precision, even if manufactured in small dimensions.

Prior art pens have a camera which is customized to each particular pen design. The camera design involves a complex trade-off between allowable pen orientations, depth of field, field of view, location of field of view with respect to the stylus tip, illumination brightness, assembly and manufacturing tolerances, etc. Even minor changes in pen design and/or use may thus result in extensive development work to adapt the camera. Clearly, it would be desirable to relax the high requirements on the camera design.

Electronic pens may include a stylus sensor which indicates to a processor in the pen that the pen stylus is in contact with a product surface, see e.g. US2005/0030297. Generally, the stylus sensor is responsive to a longitudinal movement of the stylus. Thus, the pen must be designed to allow the stylus to be longitudinally movable. If the pen is used for writing, the movement of the stylus may impair the user's writing experience. Further, unless special care is taken to seal off the front end of the pen where the stylus protrudes, moisture and dust may enter the pen. There is thus a need to for alternative contact sensors in electronic pens.

An electronic pen is designed for a specific purpose, i.e. to provide certain functionality. If an alternative or additional functionality is desired, the user needs to buy another electronic pen. One solution would be to provide a multi-purpose pen, but such a pen will be more expensive and it is still possible that the desired functionality is lacking. There is thus a need for a simple and efficient way of adding functionality to an electronic pen.

Electronic pens also include consumables that may need to be replenished from time to time, including writing ink and power. Replenishment may require the user to bring along additional devices, such as spare cartridges of ink or a battery charger. If these devices are forgotten, which is quite likely, the pen eventually becomes inoperable. There is thus a need to facilitate the replenishment of a consumable in an electronic pen.

SUMMARY OF THE INVENTION

The object of the invention is to wholly or partly overcome the above problems of the prior art.

Generally, the object of the invention is at least partly achieved by means of an optical component, a wafer structure, camera pens, a method of manufacturing, a method in a camera pen, computer-readable mediums, electronic pens, methods in an electronic pen, and protective caps for an electronic pen according to the independent claims, preferred embodiments being defined by the dependent claims.

According to a first aspect, the invention relates to an optical component for a camera pen, the component having the shape of a plate and comprising at least two non-overlapping radiation-transmitting sections: an imaging section being configured to transmit an image of an object plane, and an illuminating section being configured to transmit illuminating radiation towards the object plane. Such a plate-shaped optical component with separate imaging and illuminating sections may be manufactured in small dimensions, while yet being simple to handle and easy to mount with high accuracy in a miniaturized camera of a camera pen. The component also allows for a well-defined relation between the imaging and illuminating sections. Further, it is possible to incorporate passive optical elements in the component to provide the imaging and illuminating sections, e.g. an image-generating surface structure, an illumination-controlling surface structure, a radiation filter, a stray light shield, and an aperture stop. These optical elements may be provided as well-defined surface structures and layers on a plate substrate. Ultimately, the optical component may form a complete optical system of the camera pen, defining both imaging and illumination.

The optical component may be manufactured as a wafer structure comprising a plurality of such optical components. To this end, the optical component may be manufactured according to a method that involves providing a plate-shaped wafer substrate, and applying passive optical elements to the wafer substrate, so as to define a plurality of identical optical components, each comprising at least two non-overlapping radiation-transmitting sections: an imaging section being configured to transmit an image of an object plane, and an illuminating section being configured to transmit illuminating radiation towards the object plane. Thus, the optical components can be manufactured with high accuracy in batches. The provision of a wafer substrate also allows for simple testing and production control, since the individual components may be tested while being part of the processed wafer substrate.

The camera pen may enclose a camera housing, which comprises a first mounting structure for the optical component, a second mounting structure for an image sensor configured to detect the image, and a third mounting structure for a radiation source configured to generate the illuminating radiation. Such a camera housing is simple to handle and may provide short tolerance chains in locating the optical component, the image sensor and the radiation sensor.

The camera pen may further comprise an elongate guide pipe for receiving a stylus, the guide pipe being received in and joined to an elongate recess in an exterior wall portion of the camera housing. This design provides for a compact camera, and thus a slim pen, in that the camera housing may be brought close to the stylus. The design also provides for a small size and low weight, since the stylus need not extend through the material of the housing but rather extends through the guide pipe which is joined to the outside of housing. The design also provides for a well-defined lateral location of the stylus to the housing, as well as an option to separately optimize the material of the camera housing and the guide pipe.

According to a second aspect, the invention relates to a camera pen comprising an imaging system configured to produce an image of a surface; an image sensor configured to record said image; wherein the imaging system comprises a variable-focus lens; and wherein the camera pen further comprises a controller configured to generate a focus control signal for the variable-focus lens as a function of a parameter derived from said image. The second aspect further includes a method in a camera pen, comprising: controlling an image sensor to record an image of a surface, the image being generated by an imaging system; deriving a parameter value from the thus-recorded image; and controlling the focal length of in the imaging system based on the parameter value.

Thus, the camera pen includes a variable-focus camera which is a more versatile device than the fixed-focus cameras of the prior art. One and the same variable-focus camera can be used in different camera pens, possibly with only minor adjustments. The focus control is suitably based on the images that are used for data capture in the camera pen, thereby reducing the need for introducing additional image capturing circuitry. By controlling the focal length of the camera, the required depth of field of the imaging system may be significantly reduced compared to a fixed-focus camera. This may make possible to reduce the complexity in designing the camera.

In one embodiment, the parameter is representative of code symbols which are essentially uniformly distributed over the surface. For example, the parameter may represent the number of code symbols in the individual images. Such a parameter is easily derivable from an image whenever the pen is operated on a known coding pattern.

In one embodiment, the pen may execute a start procedure whenever a new sequence of images is to be captured by the image sensor, e.g. triggered by the pen being brought into contact with to the surface. The start procedure may involve retrieving, from internal memory, at least one starting value and outputting an initial focus control signal based on the starting value. The starting value may be calculated to minimize data loss, e.g. to result in the focal length of the imaging system being adapted to how the pen usually is oriented when first applied to a surface. The starting value may be selectively updated to reflect a factual operating condition of the pen, whereupon the thus-updated starting value may be stored in the internal memory of the pen.

In yet another embodiment to minimize data loss, the start procedure may involve controlling the imaging system to at least two different predetermined focal lengths and analyzing resulting values of the parameter.

According to a third aspect, the invention relates to an electronic pen comprising an elongate guide pipe for receiving a stylus, and a sensor for generating an output signal which indicates application of a force on the stylus, wherein the sensor operates to measure a parameter representing the capacitance between the guide pipe and the stylus. The third aspect further involves a method in an electronic pen, said electronic pen comprising an elongate guide pipe for receiving a stylus, said method comprising: sensing a parameter representing the capacitance between the guide pipe and the stylus, and generating an output signal as a function of said parameter, the output signal indicating application of a force on the stylus.

This aspect has the ability of indicating contact between the stylus and a surface without requiring the stylus to be longitudinally movable. A longitudinally fixed stylus has the potential of improving the writing experience, and makes it easier to seal off the pen's front end from dust and moisture.

In one embodiment, to enhance the change in capacitance, the pen may further comprise an abutment with an inclined control surface for engagement with a distal end of the stylus so as to cause the stylus to be laterally deflected during application of said force.

According to a forth aspect, the invention relates to a camera pen, comprising a stylus with a tip for interaction with a surface; a camera system configured to record images of the surface; a microphone; and a controller configured to selectively switch the camera pen between a low power state and a high power state based upon an output signal of the microphone. The fourth aspect further involves a method in an electronic pen, including data capturing circuitry and a microphone, said method comprising: receiving an output signal from the microphone; and selectively switching the data capturing circuitry between a low power state and a high power state based upon the output signal.

This aspect has the ability of indicating contact between the stylus and a surface without requiring the stylus to be longitudinally movable. A longitudinally fixed stylus has the potential of improving the writing experience, and makes it easier to seal off the pen's front end from dust and moisture. In one embodiment, the initial contact between the stylus tip and the surface is identified based on characteristic vibrations indicated by the output signal of the microphone.

Furthermore, the microphone may have the additional function of detecting writing noise, to be used for cleaning up a recording of sound in the surroundings of the pen. The surrounding sound may be detected by aforesaid microphone, or by a dedicated separate microphone.

According to a fifth aspect, the invention relates to an electronic pen, which comprises an elongate body, and a protective cap configured for releasable engagement with a front end portion of said body, wherein the protective cap comprises means for supplying a consumable to the pen. The fifth aspect also involves a protective cap for an electronic pen, comprising means for releasable engagement with a front end portion of the electronic pen, and means for supplying a consumable to the electronic pen when brought into operative engagement with the electronic pen.

Since the protective cap is likely to be regarded as an indispensable part of the electronic pen, this aspect ensures that an adequate supply of a consumable is carried with the pen.

In one embodiment, the protective cap comprises a self-contained power source for supplying power to the pen. In another embodiment, the protective cap comprises a reservoir for supplying a marking liquid to the pen.

According to a sixth aspect, the invention relates to an electronic pen providing data capturing functionality, comprising an elongate body containing data capturing circuitry, and a protective cap configured for releasable engagement with a front end portion of the body, wherein the protective cap comprises means for adding functionality to the electronic pen. The sixth aspect also involves a protective cap for an electronic pen providing data capturing functionality, comprising means for releasable engagement with a front end portion of the electronic pen, and means for adding functionality to the electronic pen when brought into operative engagement with the electronic pen.

This aspect provides a simple and efficient way of adding functionality to a pen. The protective cap is likely to be regarded as an indispensable part of the electronic pen, and is thus naturally brought with the pen. A range of different caps may be provided, each adding it own functionality. Thereby, different functionality may be added to a pen by simply switching cap.

In one embodiment, said means comprises at least one of a radiation source providing pointer or flashlight functionality; a camera system providing image-capturing ability; an optical system for modifying an optical characteristic of an existing camera system in the electronic pen; data processing circuitry for processing data originating from the data capturing circuitry in the electronic pen; a non-volatile memory for providing data storage capacity; and a wireless transmitter for extending the communication ability of the electronic pen.

Further objectives, features, aspects and advantages of the present invention will appear from the following detailed disclosure, from the attached dependent claims as well as from the drawings.

BRIEF DESCRIPTION OF THE DRAWINGS

Exemplary embodiments of the invention will now be described in more detail with reference to the accompanying schematic drawings, in which identical reference numerals are used to designate similar elements.

FIG. 10 is a block view of an arrangement for focus control of camera for a camera pen.

FIG. 11 illustrates depth of field requirements of a camera pen for different inclinations between the pen and a target.

FIG. 12A is a side view of an embodiment of a variable focus lens.

FIG. 12B is a section view of another embodiment of a variable focus lens.

FIG. 18B is a plan view of a cap-pen arrangement with a radiation source in the cap.

FIG. 18C is a plan view of a cap-pen arrangement with a camera in the cap.

FIG. 18D is a section view of a cap-pen arrangement with an optical system in the cap.

FIG. 18E is a plan view of a cap-pen arrangement with data processing circuitry in the cap.

FIG. 18F is a plan view of a cap-pen arrangement with a non-volatile memory in the cap.

FIG. 18G is a plan view of a cap-pen arrangement with a wireless transmitter/transceiver in the cap.

DETAILED DESCRIPTION OF THE INVENTION

General

Figure 1:
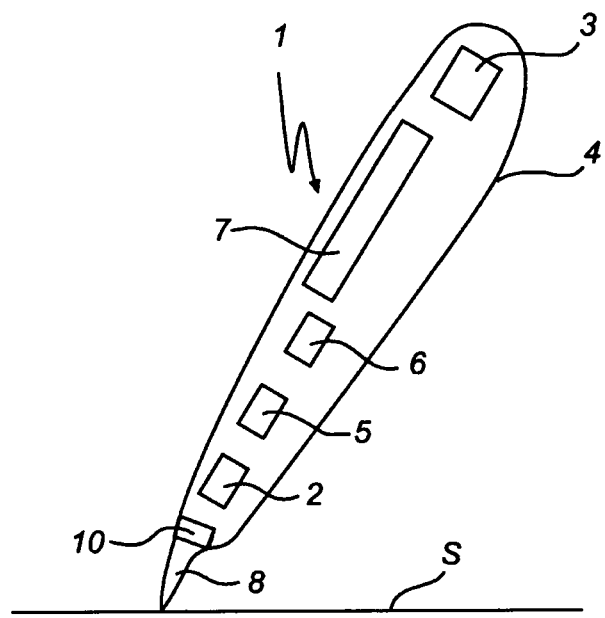
FIG. 1 is a plan view of a known electronic pen, indicating selected internal components.

The following description revolves around different aspects of electronic pens. Generally speaking, an electronic pen 1 comprises data capturing circuitry 2 enclosed in a pen-shaped casing 4, as illustrated in FIG. 1. The pen may or may not also include a data transmitter 3, a processor 5 for further processing of the captured data, a memory 6 for data storage, an internal power source 7, such as a battery, and a stylus 8 for pointing to a product surface S, and optionally for marking the surface.

The pen may further comprise a pen down detector (PDD) 10, which generates a signal indicating that the pen 1 is in an operative position relative to the product surface S. The signal from the PDD 10 may selectively activate the data capturing circuitry 2 and/or the processor 5 and/or the transmitter 3, thereby reducing the power consumption of the pen since major power-consuming components are only fully activated when the pen is in the operative position. The PDD 10 is typically implemented as an electromechanical switch at the front end of the pen or, if the stylus 8 is longitudinally movable, at the distal end of the stylus. The PDD 10 may also be configured to detect the actual force applied to the stylus 8, e.g. by a force-sensitive material being incorporated in the PDD, e.g as disclosed in WO 03/069547.

One class of electronic pens is the camera pen, in which the data capturing circuitry 2 is configured to capture data in the form of images of the product surface S. The images may then be processed, inside or outside of the pen, for data extraction. In one example, relative or absolute positions are derived from the images to represent a movement of the pen on the product surface. In another example, data is extracted from a machine-readable code in the image, such as a bar code or matrix code. In yet another example, handwritten or printed text is identified in the images and processed for character recognition.

For position determination, the product surface S may or may not be specially formatted. In the former case, the product may be provided with a coding pattern which codes absolute positions on the product surface, see e.g. U.S. Pat. No. 6,663,008. In the latter case, the pen may capture images of the whole product surface, so that positions may be determined with respect to a corner and an edge of the product surface, see e.g. WO 2004/077107. Alternatively, an electronic trace of the pen's movement may be determined by correlating a series of partially overlapping images, see e.g. U.S. Pat. No. 6,985,643. Still further, positions may be derived by analyzing coherent radiation reflected off the product surface, see e.g. U.S. Pat. No. 6,452,683.

Figure 2:
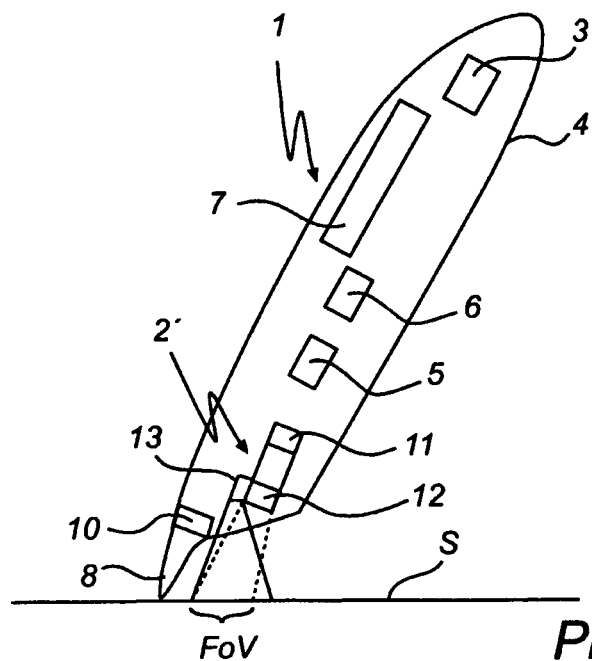
FIG. 2 is a plan view of a known camera pen, indicating selected internal components.

Such a camera pen 1 may comprise a camera or camera system 2' with an electromagnetic radiation sensor 11 for recording the images, as illustrated in FIG. 2. The camera 2' may also include an imaging system 12 which projects an image of the product surface S onto the radiation sensor 11. The sensor 11 could consist of a surface of radiation-sensitive elements or a two-dimensional arrangement of separate radiation-sensitive devices. Typically, the sensor and the imaging system are optical, but they could alternatively be configured to indicate any suitable property of the product surface, this property being magnetic, capacitive, inductive, chemical, etc. It is to be understood that the camera pen may include further components, similarly to the pen in FIG. 1.

The camera 2' may also comprise a radiation source 13 for illuminating the product surface S within the field of view FoV of the imaging system 12, and there may also be provided a beam-controlling system (not shown) to direct and/or shape the illuminating radiation with respect to the field of view.

Finally, it should be noted that other techniques for position determination in electronic pens have been suggested. Such techniques include sensing the movement of a roller ball in contact with the product surface, triangulating a position based on signals received from a plurality of external sources of radiation or ultrasound, processing of signals from pen-resident acceleration sensors, processing of signals from strain sensors associated with the stylus, and combinations of any of the above techniques.

Below follows a detailed description of preferred embodiments of a number of different aspects related to camera pens in particular, but in some cases to electronic pens in general. These aspects include a compact camera for camera pens, a versatile imaging system for camera pens, alternative PDD-devices for electronic pens, and multi-functional protective caps for electronic pens.

Generally, it is to be understood that methods and processes described or implied in the following, to applicable extent, may be embodied as program instructions to be executed by a processor. For example, the program instructions may be provided to the processor on a computer-readable medium, as carried on an electrical carrier signal, or as embodied on a read-only medium.

Camera Design

Figure 3:
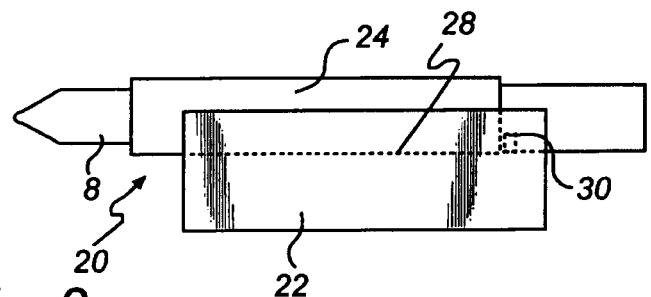
FIG. 3 is a side view of an embodiment of a camera module for a camera pen.
Figure 4:
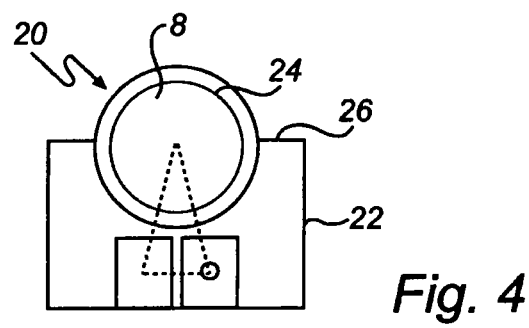
FIG. 4 is a front view of the camera module in FIG. 3.

FIGS. 3-4 schematically illustrate a camera module 20 for a camera pen. The module includes a camera housing 22 and a tubular guide 24 for locating an elongate stylus 8 with respect to the housing 22. The housing is configured to hold imaging components required to generate and electronically capture an image of a product surface. The guide 24 is incorporated into the top wall 26 of the housing 22.

This camera module has a number of potential advantages. For example, it allows for a compact design since the housing 22, and thus the imaging components, may be brought close to the stylus 8, allowing a slim design of the camera pen. Further, size and weight may be kept down since the guide 24 is not enclosed within the housing 22 but rather incorporated as part of the exterior surface of the housing 22. Yet, the design allows for a high strength and durability. The design may also allow for short tolerance chains and a well-defined lateral location of the stylus 8 to the housing 22.

The housing 22 and the guide 24 may be two separate parts configured to be combined in an assembly step, e.g. by gluing, welding, clamping, use of fixtures, screws, etc. In the illustrated embodiment, the peripheral surface of the guide 24 is received in an open channel 28 in the top wall 26 of the housing 22. The channel 28 has an abutment 30 for engagement with an end surface of the guide 24, so as to locate the guide 24 in the longitudinal direction during the assembly step. It should be realized that the channel 28 could have any inclination with respect to the housing 22 so as to locate the guide 24, and thus the stylus 8, with a desired inclination to the optical components in the housing. Such an inclination may be desired e.g. to locate the field of view of the camera module 20 close to the tip of the stylus 8.

The illustrated two-piece design has the potential of facilitating manufacture, e.g. since different and individually optimized production techniques may be used to manufacture the guide 24 and the housing 22, respectively. Also, manufacture may also be optimized with respect to the tolerances of the different parts, thereby reducing the cost of manufacture. Further, the guide 24 and the housing 22 may be made from different materials.

However, a one-piece construction of the guide 24 and the housing 22 is also conceivable, to reduce assembly work.

It may be noted that the stylus 8 may or may not be longitudinally movable in the guide 24. Conventional PDDs 10 (FIG. 1) generally require a movable stylus 8, whereas the novel PDD described below may be incorporated into the present camera module 20 to relax or remove this requirement.

Figure 5:
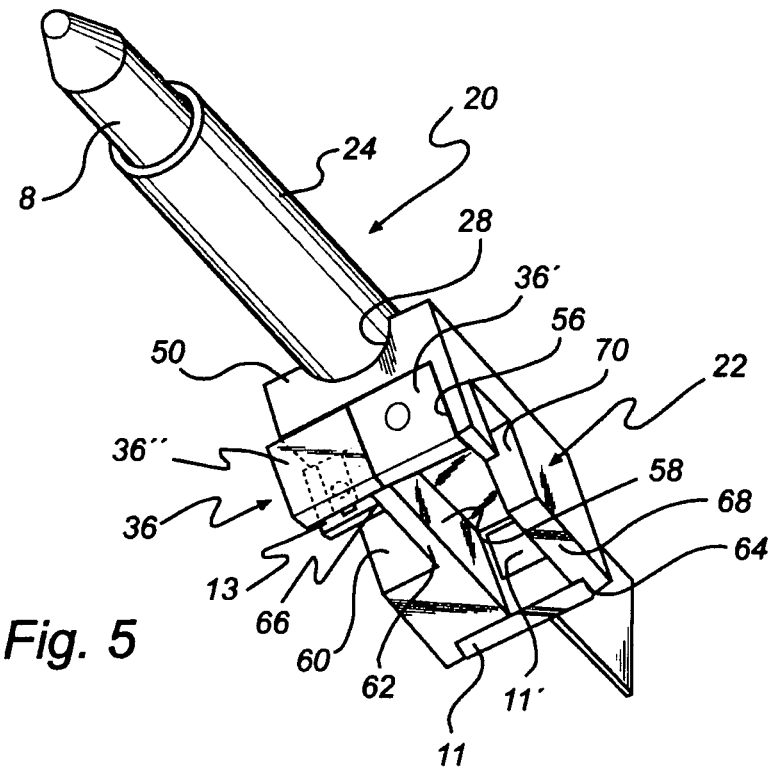
FIGS. 5-6 are perspective views of the camera module in FIG. 3, illustrating further details thereof.
Figure 6:
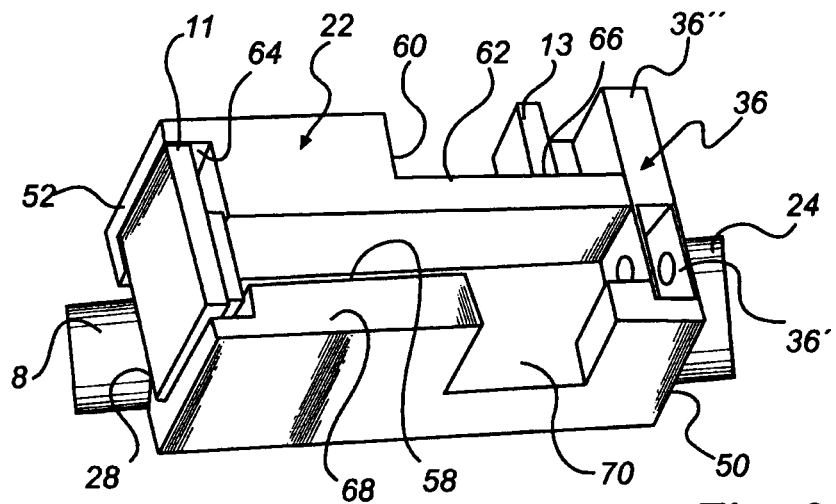

FIGS. 5-6 illustrate an embodiment of the camera housing 22 in more detail. The camera housing is configured to locate a two-dimensional radiation sensor 11, such as a CMOS, CCD or CID sensor, an emitter 13 of illuminating radiation, such as an LED or laser diode, and a single optical component 36 which serves both to project an image of a product surface onto the radiation sensor 11 and to direct the illuminating radiation from the emitter 13 onto the product surface.

Figure 7:
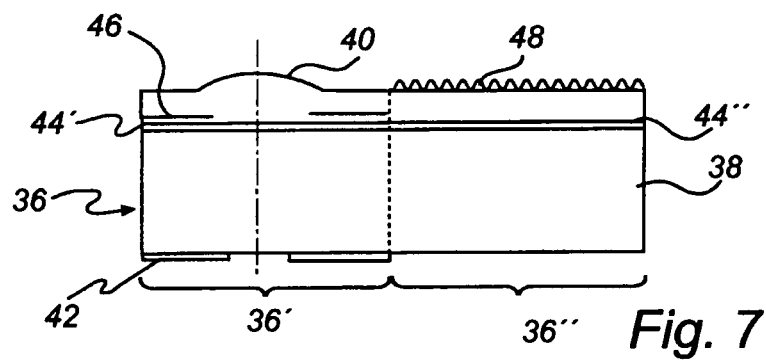
FIG. 7 is a side view of an optical component for installation in the module in FIG. 3-6.
Figure 8:
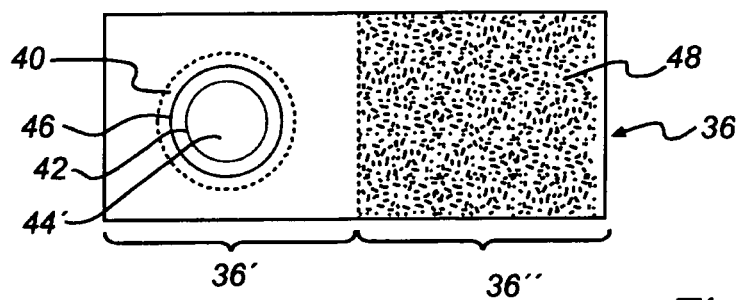
FIG. 8 is a top view of the component in FIG. 7.

The optical component 36 is further illustrated in FIGS. 7-8. The component is of unitary construction and includes various passive optical elements to define an imaging section 36' and an illuminating section 36". These sections are formed side-by-side on a common substrate 38 which is transparent in the relevant wavelength range. Examples of suitable substrate materials include glass, sapphire, plastics, etc.

The imaging section 36' includes a surface lens structure 40 and an aperture stop 42, which are designed and arranged to produce, at an image plane, an image of a nominal object plane, with a desired depth of field. The lens structure 40 and the aperture stop 42 are suitably provided on opposite sides of the substrate 38, with the aperture stop 42 facing the object plane. In alternative embodiment (not shown), the lens structure 40 and the aperture stop 42 are located on the same side of the substrate 38, but it is presently believed that spacing these elements may result in greater flexibility of design. For example, the thickness of the substrate may be chosen to obtain a desired spacing, e.g. with respect to field curvature or chief ray angle. Typically, the substrate 38 has a thickness of about 0.5-2 mm.

The lens structure 40 may be formed as a refractive surface, e.g. a curved surface as shown in FIG. 7. In one embodiment, the curved surface is an even asphere. Alternatively or additionally, the lens structure 40 may comprise diffractive elements, such as a Fresnel lens structure. If contrast requirements are high, a refractive surface may be preferred. The diameter of the lens structure 40 may be on the order of about 0.5-2 mm.

The aperture stop 42 is formed as an opening in a non-transmissive coating applied to the substrate 38 in alignment with the lens structure 40. The coating may be made of any suitable material. One such material is black chromium which is a frequently used plating material.

The imaging section 36' may further comprise a radiation filter 44' to selectively transmit radiation in a confined wavelength range. Suitably, the wavelength range includes the wavelength of the illuminating radiation. In one example, the filter 44' transmits near-infrared radiation (NIR) and blocks shorter wavelengths. The filter 44' may be a coating applied to the substrate 38, on either side of the substrate, or both. The coating may form an absorption filter or an interference filter. In an alternative embodiment, the coating is replaced or supplemented by an absorptive substance dispersed in the substrate material.

The imaging section 36' may further comprise a baffle 46 to prevent stray radiation from reaching the image plane. Such stray radiation originates from outside the field of view FoV in the object plane (FIG. 2). The baffle 46 may be implemented as an opening in a non-transmissive material, similar to the material forming the aperture stop 42.

The illuminating section 36" comprises a surface lens structure 48 which is designed to shape and/or redirect the beam of illuminating radiation from the emitter 13 (FIG. 5). The lens structure 48 could be arranged on either side of the substrate 38, although it may be preferred, for reasons of manufacture, to have both lens structures on the same side of the substrate. The lens structure 48 may be either diffractive (as shown in FIG. 7) or refractive. A diffractive structure may be preferred to accomplish aforesaid beam shaping ability in a cost-effective manner.

The illuminating section 36" may also comprise a radiation filter 44" similar to the filter 44' in the imaging section 36'.

The optical component 36 may be provided as a compact, unitary and miniaturized part integrated with all necessary optical elements. In a commercial embodiment, the component may have a footprint of about 5 mm by 2 mm.

The structures 40, 48 may be provided to the substrate via any suitable technique, such as injection molding, embossing, lithography, etching, machining, etc, with the coating(s) 42, 44', 44", 46 being applied via any suitable application technique, such as vapor deposition, plating, painting, etc. A currently preferred process for manufacturing the optical component 36 will later be described with reference to FIG. 9.

Returning now to FIGS. 5-6, an embodiment of the camera module 20 of FIGS. 3-4 incorporating the above component 36 will be described in further detail. The housing 22 of module 20 extends between front and rear ends 50, 52. The housing 22 has a top wall with an adequate thickness to accommodate a longitudinal recess 28 adapted to mate with the periphery of the tubular stylus guide 24. The front end of the housing has an opening 56 which defines a mount for the optical component 36 to align the imaging and illuminating sections 36', 36" of the mounted component with an imaging compartment 58, 60, and an illuminating compartment 58, 60, respectively, inside the housing. These compartments 58, 60 are separated by a longitudinal non-perforated partition 62 extending between the front and read ends 50, 52. When mounted, the component 36 closes off the front opening 56.

A compact design of the camera module 20 is achieved by arranging the imaging and illuminating compartments 58, 60 side by side in a geometrical plane separate from the center axis of the guide 24. Thereby, the camera module locates the imaging compartment 58, the illuminating compartment 60 and the stylus 8 at a respective corner of a triangle, as seen from the front of the module (see dotted lines in FIG. 4). The triangle may, but need not, be an isosceles triangle.

The rear end of the housing 22 has a mount 64 for the radiation sensor 11. The mount 64 is arranged such that the active surface, i.e. the radiation-sensing area 11', of the radiation sensor 11 is aligned with and faces the imaging compartment 58. The camera module 20 is thereby configured to locate the active surface 11' in the image plane of the optical component 36.

The housing 22 further comprises a mount 66 for the emitter 13 in the illuminating compartment 60 at a predetermined distance from the front mount 56, so as to locate the emitter 13 at a nominal distance from the beam controlling lens structure 48 (FIG. 7). The nominal distance is set such that the characteristics of the beam incident on the component 36 match the beam controlling features of the lens structure 48.

The imaging compartment 60 is defined by the radiation sensor 11, the imaging section 36' of the component 36, the partition 62 and a side wall 68. An opening 70 is defined in the side wall to form a radiation trap. The trap 70 is positioned to collect and attenuate illuminating radiation that passes through the component 36 without originating from the field of view FoV in the object plane (FIG. 2). The trap 70 may open into the pen body, or it may be sealed off e.g. through application of a radiation-absorbing tape or the like on the outside of the component.

The housing 22 is suitably made as a unitary component, and it may be manufactured by any suitable technique(s) such as molding, machining, etc. In one embodiment, the housing is made of plastic material. In another embodiment, the housing is made of metal to provide for a reduced wall thickness, and thereby reduced overall size.

Since the module 20 is located at the front end of the pen, the size of the module has a large impact on the design of the pen. It may thus be imperative to reduce its size, especially its transverse dimensions. To keep size down, certain wall portions may be omitted. FIGS. 5-6 illustrate one such example, in which the side wall of the illuminating compartment 60 is omitted. Likewise, the bottom wall may be omitted, leaving the illuminating and imaging compartments 58, 60 exposed. If needed, these sides could be wholly or partly sealed off through application of a separate sheet material, e.g. a radiation-absorbing tape or the like. Such an open-walled design of the housing 22 may also provide for simplified manufacture of the housing.

Figure 9:
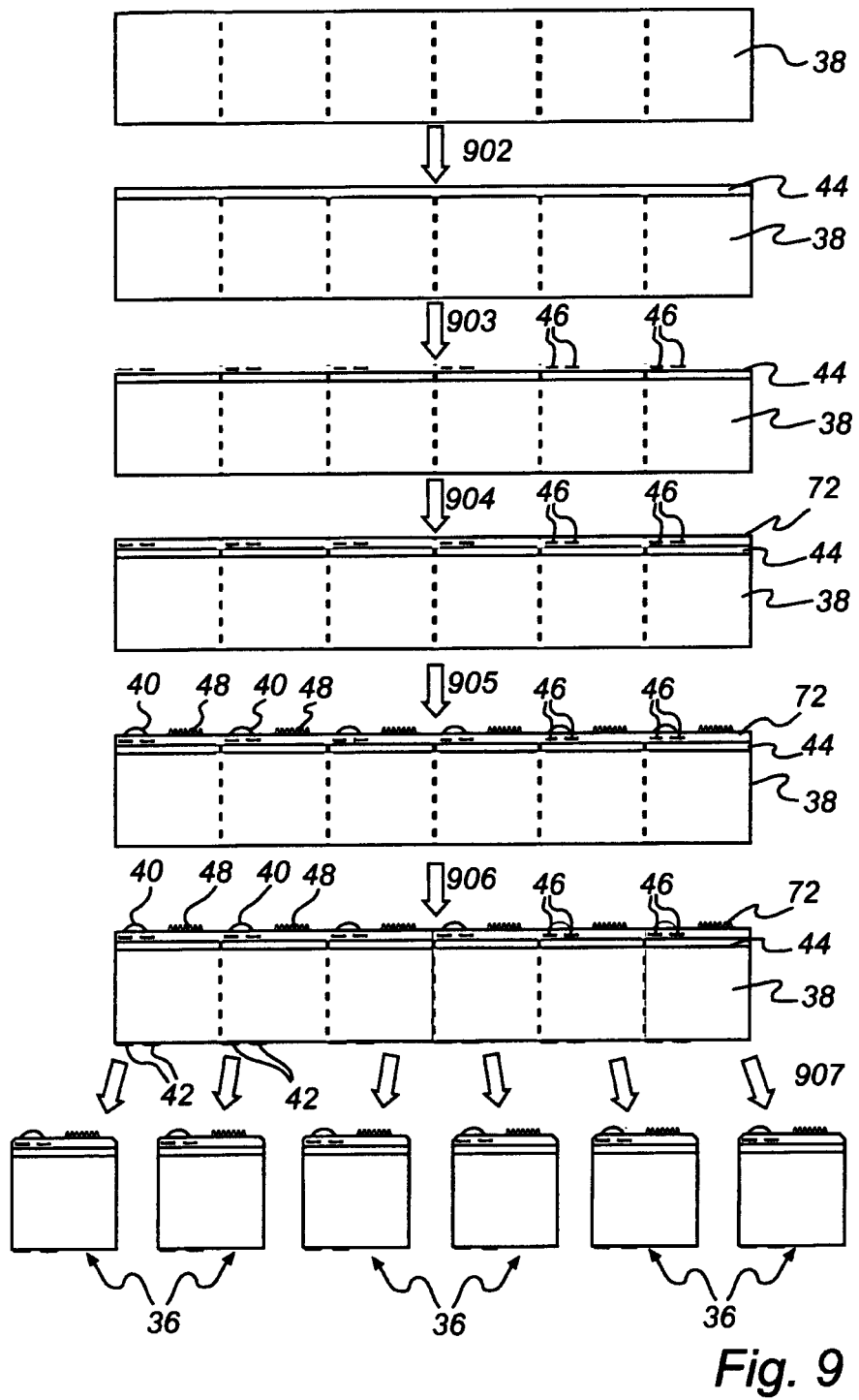
FIG. 9 is a sequence of side views to illustrate a process for batch manufacture of the component in FIGS. 7-8.

FIG. 9 serves to illustrate a process for manufacturing an optical component 36 of the type shown in FIGS. 7-8. The process builds a batch of optical components from a plate-shaped substrate, and FIG. 9 illustrates how the substrate changes throughout the process.

The process is thus based on a plate-shaped wafer substrate 38 of a suitable material, such as glass or plastics, which is modified in a number of process steps. The wafer substrate is typically a disc or rectangular plate of a form-stable material. The substrate material should be transparent in the relevant wavelength range. Absorptive components may or may not be dispersed in the substrate material to selectively block transmission of certain wavelengths. The dotted lines in FIG. 9 are included for illustrative purposes only, to indicate the location of the individual optical components.

In step 902, a thin coating in the form of one or more layers 44 of filter material is applied to the wafer, to form the absorption/interference filter(s) 44', 44". Different coatings may be applied to the imaging and illuminating sections of the components, depending on the required transmission characteristics of each section.

In subsequent step 903, a non-transmissive coating is selectively applied to the wafer, on top of the radiation filter 44', so as to form the stray light baffle 46 of each component.

In step 904, a uniform film 72 of deformable material is applied onto the wafer. The deformable material is suitably in a plastically deformable, viscous or liquid state. In one embodiment, the deformable material is a thermoplastic material or a resin, e.g. an epoxy resin.

In step 905, the image-forming and beam-controlling lens structures 40, 48 are embossed into the deformable film, suitably by pressing a replication tool against the film 72. The replication tool suitably has a replication surface with structural features being a negative of the lens structures 40, 48 to be formed in the film 72. The replication surface may be at least the same size as the wafer, so that all lens structures are formed in one embossing step, or it may be of smaller size, so that the lens structures are formed by repetitive embossing across the wafer surface. The resulting replica is then hardened, e.g. by UV curing, either after removal of the replication surface or while the replication surface is in contact with the deformable film.

In step 906, a further non-transmissive coating is applied to the opposite side of the wafer, in registration with the image-forming lens structures 40, so as to form the aperture stop 42 of each component.

Finally, in step 907, the processed wafer is cut up into individual optical components 36.

The above-described manufacturing process allows for simple, efficient, and inexpensive mass-production of the optical components with adequate accuracy. It also allows for simple testing and production control, since the individual optical components can be tested while being part of the processed wafer.

It should be noted that alternative techniques could be used to produce the lens structures on the wafer. For example, a resist pattern could be formed on the wafer using conventional photo-structuring or electron beam structuring techniques relying on masks or the like. This resist pattern may be used as a diffractive lens structure, or the wafer material exposed by the resist pattern may be etched to produce lens structures of desired shape. Likewise, it should be understood that the above steps may be performed in an alternative order, and that certain steps may be omitted altogether.

Camera Control

The camera 2' in a camera pen (FIG. 2) generally captures images within a field of view FoV located on one side of the stylus tip 8. This causes the distance between the camera and the object, typically a generally flat target such as a sheet of paper, to change significantly with the orientation of the pen, i.e. for a large range of angles between the object and the camera. Therefore, the camera is designed to have a large depth of field, so that images of adequate quality can be captured over the entire range of object distances that can occur when the pen is manipulated on the object. Such a camera typically has a high f-number, permitting little light from reaching the image plane, and thus the radiation sensor 11. This, in turn, puts high requirements on the sensitivity of the radiation sensor 11 and/or the brightness of the radiation source 13.

FIG. 10 illustrates a camera 2' that may mitigate these high requirements. The camera 2' includes a variable focus lens 80. The location of the focal point of the lens 80, and thereby the focal length of camera 2', is controlled as a function of object distance, given by a parameter p derived from a previously captured image I. If the focal length can be adjusted as a function of the object distance, the required depth of field may be reduced. The depth of field need only correspond to the range of object distances spanned by the object in an image captured by the pen at a predetermined maximum angle between the object and the camera. This may correspond to a significant reduction in depth of field. For example, a camera pen commercially available from the present Applicant has a required depth of field of about 8 mm, which may be reduced to about 2.5 mm by implementing the above principles. This improvement is further illustrated in FIG. 11, which schematically indicates the extent of the field of view for two different tilts (−45°, +45°) around the contact point between the stylus tip and the object surface S. The location of relevant information within the field of view is indicated by thick lines. Clearly, this relevant information must be attainable from the images, thus setting a requirement on the minimum depth of field. The required depth of field with and without a variable focus lens is indicated by FD1 and FD2, respectively.

FIG. 12A illustrates one embodiment of a variable focus lens 80. Here, an actuator 81 is operatively connected to a lens component 82 and arranged to move the component 82 along the optical axis as a function of an electrical control signal c. The actuator 81 may include a micro-mechanical motor 84 with a pinion and rack arrangement 86', 86" to convert the torque of the motor to a linear motion of the component 82, which is fixedly connected to the rack 86". Alternatively (not shown), the component 82 may be placed on a plurality of surface structures on an electro-active (e.g. piezoelectric) material, the surface structures being controllable by application of a voltage to synchronously vibrate in the surface plane of the structure so as to move the component 82 in small stick-and-slip steps. Still further (not shown), the actuator 81 may include a twisted piezoelectric bender tape which is wound helically around the component 82, as described in WO 02/103451, wherein application of voltage to the tape causes a change in tape length that results in a linear motion of the component 82 along the major axis of the helical structure. In yet another alternative (not shown), the actuator 81 may include a so-called voice coil arrangement, in which movement is controlled by driving an electric current through a coiled wire, which is attached to the component 82 and arranged in a surrounding magnetic field.

FIG. 12B illustrates another embodiment of a variable focus lens 80, in which the shape of a lens surface is modified to shift the focal point. The lens 80 is a "liquid lens", comparable to a lens developed by Philips and described in WO 03/069380. The lens 80 comprises a cylindrical electrode 88 forming a capillary tube, which is sealed by a transparent front element 90 and a transparent rear element 92 to form a fluid chamber containing two fluids, typically liquids A, B. The two liquids A, B are non-miscible, whereby a meniscus l is formed at their interface. Liquid A is electrically insulating and liquid B is electrically conducting, and they have different refractive indices. The cylindrical electrode 88 is coated by a fluid contact layer 94. The wettability of layer 94 to liquid B varies under application of a voltage. Thus, when the wettability changes, so does the shape of the meniscus l. Thus, the focal length of the liquid lens 80 may be controlled as a function of the applied voltage between the cylindrical electrode 88 and an annular electrode 96 arranged at one end of the chamber. The lens 80 can be manufactured in dimensions down to a radius of about 1-2 mm, suitable for incorporation in miniaturized cameras for camera pens. Alternative configurations of liquid lenses are known, i.a., from US 2005/0002113, US 2006/0126190, US 2006/0152814, and references therein.

Returning to FIG. 10, the camera 2' may be controlled by a control module 100 which generates and outputs a control signal c, for the actuator 81 of the variable focus lens 80, based upon a parameter value p derived from an analysis module 102. The analysis module 102 derives the parameter value p from images I captured by the camera's image sensor 11, or by a separate optical device (not shown). Generating the control signal c may include the control module 100 inputting a current parameter value p to an algebraic expression, or the control module 100 accessing one or more look-up tables, or other suitable data structures, with the current parameter value p as input. The control and analysis modules 100, 102 may be implemented by software executed by a microprocessor and/or by dedicated hardware, such as an ASIC, DSP, FPGA, etc.

Figure 13A:
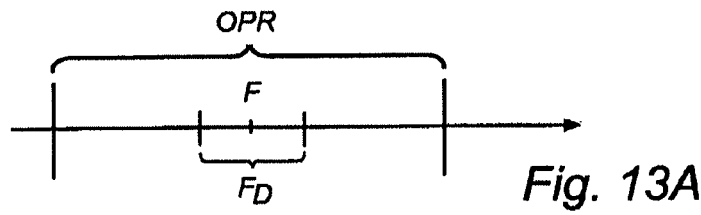
FIG. 13A is a graph showing a relation between operating range and depth of field for a camera pen.
Figure 13B:
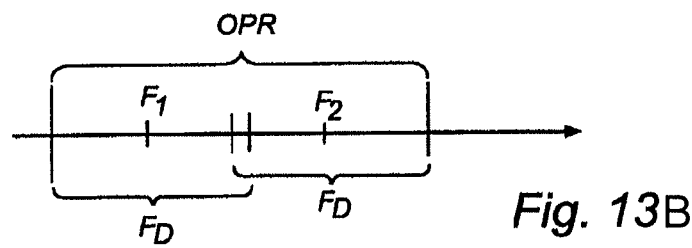
FIG. 13B is a graph showing how a camera pen can be controlled to switch between two focal points to cover an operating range.

For the focus control to be stable, it may be necessary to ensure that the parameter value p is always derivable from the images I. As shown in FIG. 13A, the pen is designed with an operating range OPR given by difference between the allowable minimum and maximum object distances (equal to FD2 in FIG. 11 and given by worst-case inclinations of the pen to the object surface). The camera has a more limited depth of field FD, around a focal point F. The location of this focal point F is varied to ensure that the detected images are sufficiently sharp over the operating range OPR. The focal point F could be continuously adjusted over the operating range OPR, or it could be adjusted between predetermined steps. FIG. 13B illustrates an embodiment where the camera is switched between only two focal points F1 and F2 to cover the operating range.

With an image frame rate of 70-100 Hz, it should be realized that the object distance is likely to change relatively slowly between images while the pen is being moved by hand over the surface. Thus, as soon as it is possible to derive a proper parameter value for one image, the focus of the camera can be adequately controlled for all subsequent images.

The control and analysis modules 100, 102 suitably operate synchronously with the image capturing process. It is conceivable that the control and analysis control modules 100, 102 operate at the frame rate of the image capturing process, but they may alternatively operate at a fraction of this frame rate if the expected change in object distance between images is small in relation to the depth of field of the camera. For example, if the object distance is expected to change slower than 30 mm/s, and if the image frame rate is 100 Hz and the depth of field is 2.5 mm, it would be sufficient to use a control rate of 100*2.5/30=8.33 Hz, i.e. the control signal c is updated for every $12^{th}$ image. Of course a higher control rate can be used, for example to increase the accuracy of the focus control.

There are several conceivable image parameters that can be used for focus control.

In one embodiment, the parameter value represents the average contrast in the current image. Methods for calculating the average contrast are straight-forward, fast and well-known to the skilled person.

In another embodiment, the analysis module 102 derives a parameter value representative of the current defocus. In such an embodiment, the defocus may be derived at comparatively high accuracy based on phase comparison focus detection, known to the person skilled in the art.

In yet another embodiment, the parameter value is given by orientation data derived from the current image. Such orientation data may include perspective data, for example given by a linear or homogeneous transformation matrix, or data extracted therefrom. Alternatively or additionally, the orientation data may comprise a combination of a tilt angle (i.e. the angle between the camera's optical axis and the object) and a skew angle (i.e. the rotation of the camera around a longitudinal axis of the pen), or data derived therefrom. In yet another example, the orientation data includes the average object distance, given as the distance between the object and a reference point on the pen, typically the radiation sensor. The calculation of orientation data may be based on a known property of the surface, e.g. a general property of a graphical coding pattern on the surface. Different methods and system for calculating orientation data is disclosed in U.S. Pat. No. 7,050,653, U.S. Pat. No. 6,929,183, and US2002/0048404.

In a further embodiment, the parameter value is given by a magnification derived from the current image.

It is also conceivable that the parameter value directly reflects a property, or combination of properties, of the object surface as detected from the current image. For example, when the surface bears a position-coding pattern made up of a predetermined arrangement of graphical code symbols, the number of code symbols in the detected image will vary as a function of the distance between the sensor and the surface. The parameter value may be a count of individual code symbols or code symbol elements in the image.

Figure 14A:
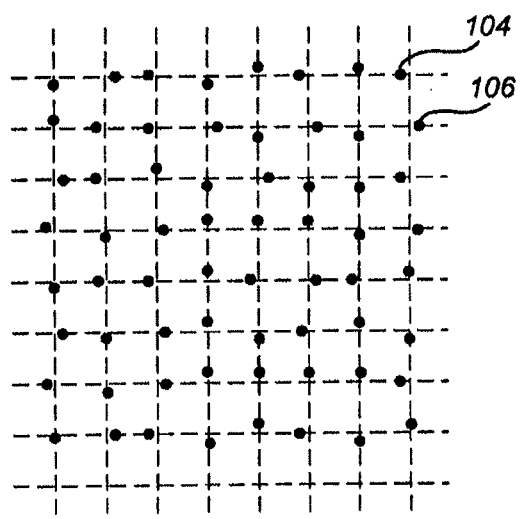
FIG. 14A is a view of a known dot pattern for encoding information.
Figure 14B:
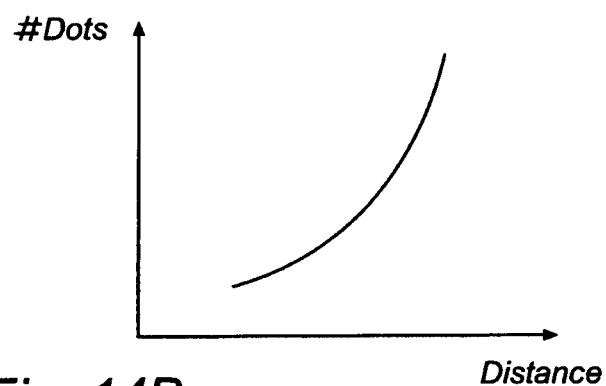
FIG. 14B is a graph showing an example of how the number of dots varies as a function of object distance in images of the dot pattern in FIG. 14A.

FIG. 14A shows an example of a known coding pattern, developed by the present Applicant and described in e.g. U.S. Pat. No. 6,663,008. The pattern is made up of marks (dots) that are arranged with respect to a regular grid formation. Each mark may represent a code value, which is given by the direction of displacement between the mark and its reference point in the grid formation. There may also be provided marks (not shown) to indicate the location of the grid formation. This pattern has a known (nominal) density of marks, and the number of marks as perceived in the detected images varies as a function of the distance between the image sensor and the coded surface. FIG. 14B shows an example of how the number of dots may vary as a function of object distance for one particular design of a camera pen. Using the relation in FIG. 14B, the control module 100 could be designed to output a proper focus control value based on a parameter value indicating the number of dots in the current image, as calculated by the analysis module 102.

As mentioned by way of introduction, the pen may be configured to start capturing/processing images when in it is in sufficient proximity to the surface, e.g. as indicated by a pen down detector (PDD). The control module 100 will not be able to adjust the focus of the camera until a proper parameter value is derived from a captured image. There is thus a potential risk for loss of data at pen down. There are different measures to be taken to reduce this risk.

One measure would be to design a coding pattern such that a parameter value can be derived within the entire operating range OPR. For example, the coding pattern may include one or more dedicated focusing features, such as symbols tailored to be visible irrespective of defocus within the operating range OPR. It is also conceivable that the code symbols themselves contain or provide such focusing features. For example, although an image of code symbols located outside the depth of field FD may not be decodable, it may still be possible to derive the number of code symbols in such an image and to control the focal point based on this number.

Another measure may be for the control module 100 to set the camera 2' at a focal point given by a default starting value, which has been derived to minimize data loss. The camera may thus be controlled to match the starting focal point with the most probable object distance at pen down. Such a starting value may be calculated based on user-specific characteristics, e.g. to reflect the user's normal angle of attack when applying the pen to an object. The starting value may be pre-calculated and fixed over time, or it may be intermittently updated based on the how the pen is actually used. For example, the starting value may be set to reflect the average object distance calculated for a given preceding period, such as for a given number of preceding strokes, or a given time period (seconds, minutes, days etc). Alternatively, the starting value may be given by the parameter value used by the control module at the beginning or end of the immediately preceding stroke, or an average (optionally weighted) of the parameter values derived during the immediately preceding stroke.

Yet another measure may be to design the control module 100 to switch between different starting values, until a proper parameter value can be derived from the resulting image. The different starting values thus result in the camera being set to different focal points in the operating range OPR. Thereby, the camera is controlled to scan the operating range until a sufficiently sharp image is captured. Suitably, the scanning is effected in steps corresponding to the depth of field of the camera. Returning to the example of FIG. 13B, the camera may thus be switched between focal points F1 and F2 at pen down. If the switching rate is comparable to the image frame rate, the maximum data loss is one image, or possibly a few images.

If the control and analysis modules 100, 102 are operated at a control rate which is a fraction of the image frame rate, loss of data could be reduced by using a higher control rate at pen down until a proper parameter value can be derived from one of the captured images, i.e. until the focus control is operating properly.

Clearly, the above measures can be combined to further improve on the robustness of the camera control.

It is also possible that the camera pen may be switchable between different operating modes, each such mode causing the pen to apply different algorithms for image processing/decoding and/or for post-processing of decoded data. If the pen is likely to be differently oriented to the object surface in different modes, the pen may store and retrieve a dedicated starting value for each such mode. For example, the camera pen may be set in different modes for reading different types of machine-readable codes. Still further, the pen may be used in a contact mode to read data off the object surface with the pen in physical contact with the object surface, e.g. via the stylus, and in a hover mode to read positions off the object surface with the pen being held within a short distance range above the object surface. The hover mode may result in decoded positions being streamed from the pen to an external device for real time control of cursor position on a display. In the hover mode, the pen may be controlled to output three-dimensional position data, i.e. decoded positions and the pen's distance to the object surface, thereby allowing the pen to be used, e.g., for 3D control similar to a joystick.

It should be realized that the variable-focus cameras described above are more versatile that the fixed-focus cameras used in camera pens of the prior art. The same variable-focus camera can be used in different types of camera pens, possibly with only minor adjustments. The provision of variable focus may also allow a designer to relax the requirements on one more camera design parameters, such as allowable pen orientations, depth of field, field of view, location of field of view with respect to the stylus tip, illumination brightness, assembly and manufacturing tolerances, etc.

Pen Down Detection

In known electronic pens, the pen down detector (PDD) is responsive to a longitudinal movement of the stylus. This requires the stylus to be movable, which may have a negative impact on the writing experience. Also, it may be difficult to properly seal off a pen from dust and moisture if the stylus is to be movable.

Figure 15:
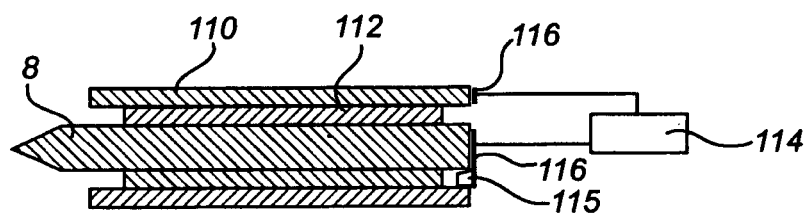
FIG. 15 is a section view of an embodiment for detecting pen down/pen up via capacitance changes.

FIG. 15 illustrates a PDD arrangement 10' which does not require a longitudinal movement of the stylus to operate. The arrangement comprises a stylus 8 and a cylindrical tube 110, both of which are at least partially made of electrically conducting material so as to form a pair of electrodes. These electrodes are spaced from each other by a solid dielectric 112, i.e. an electric insulator. Any suitable dielectric could be used, such as porcelain, glass, plastics, rubber, etc. The PDD arrangement 10' further includes a detector 114 which is electrically connected to the electrodes. The detector 114 may be configured to detect a sufficient change in a voltage over the electrodes, indicating that the pen in contact with the product surface or not. Such detectors are known to the skilled person.

The detected change may at least partly result from charge entering or escaping the stylus 8 when it is put down on a product surface, and/or from a change in the actual capacitance between the electrodes.

The PDD arrangement 10' may also be designed to allow for small lateral movements of the stylus 8 in the tube 110. This may be accomplished by including a flexible dielectric 112 in the PDD arrangement. Thus, when the stylus 8 is operated in contact with a product surface, the spacing between the stylus 8 and the tube 110 varies slightly, resulting in corresponding variations in capacitance between these elements. The variations in capacitance may be enhanced by using a pressure-sensitive dielectric, i.e. a material with a permittivity that increases as the material is compressed.

The PDD arrangement 10' may further include a guide element 115 that induces lateral movement of the stylus when pressed against a surface. In the embodiment in FIG. 15, the guide element has an inclined control surface for engagement with the distal end of the stylus so as to cause the stylus to be laterally deflected when pressed towards the control surface. The guide element 115 may be fixedly connected to the tube 110, or any other stationary part inside the pen.

It may be desirable for the stylus 8 to be removable from the pen, e.g. to allow a user to replace an empty inking stylus or to switch between different types of styluses. In one such embodiment, the dielectric 112 is provided as a lining or coating on the inside of the tube 110, allowing the stylus 8 to be slid into and out of the tube 110. Preferably, the stylus 8 is slid into contact with a connector/contact 116 which electrically connects the stylus 8 to the detector 114. Suitably, the stylus 8 is held in place by snug fit to the dielectric 112. In another variant, the stylus 8, tube 110 and dielectric 112 form a replaceable unit, which is slidably received in a tubular guide (not shown) inside pen. The unit is suitably slid into contact with a pair of connectors/contacts 116 which electrically connects the stylus 8 and the tube 110, respectively, to the detector 114.

Figure 16:
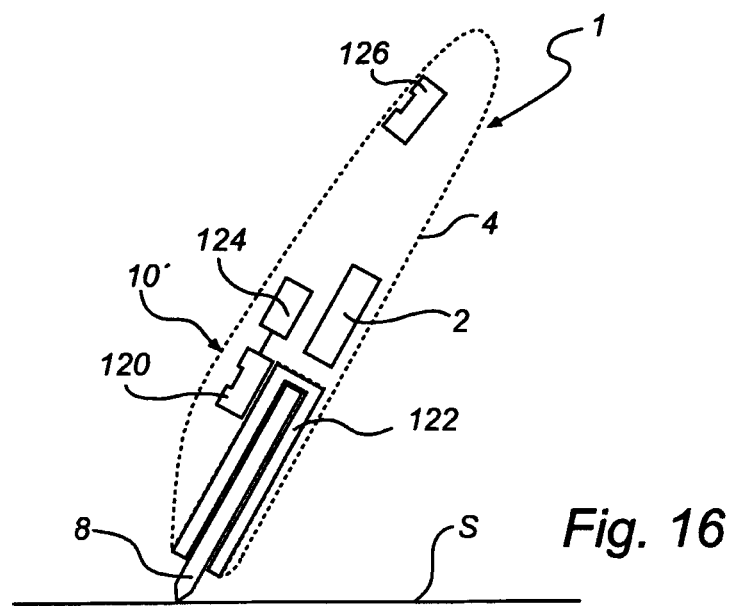
FIG. 16 is a plan view of an electronic pen incorporating an embodiment for detecting pen down/pen up via a vibration sensor.

FIG. 16 illustrates a PDD arrangement 10' which operates by detection of vibrations. It may or may not be designed to allow for longitudinal movement of the stylus 8.

The pen may thus comprise a vibration sensor 120, which may or may not be arranged in association with the stylus 8. In one embodiment, the vibration sensor 120 is mounted on a guide/holder 122 for the stylus 8 so as to pick up the vibrations that are generated by the stylus 8 when it is put down on a product surface S, and when it is subsequently manipulated on this surface. In another embodiment (not shown), the sensor 120 is mounted on the stylus 8 itself. A controller or processor 124 is connected to analyze the output signals of the vibration sensor 120. Whenever these signals indicate pen down, the controller 124 may selectively activate the data capturing circuitry 2 and other circuitry, if present. In one embodiment, the controller 124 is configured to detect pen down by identifying characteristic vibrations that are generated when the stylus 8 is applied to the surface S. Similarly, the controller 124 may deactivate the data capturing circuitry 2, and other circuitry, when the vibration signals indicate that the pen has been lifted from the surface S.

In one embodiment, the vibration sensor 120 is a microphone. This microphone may have the dual purpose of being arranged to capture stylus vibrations and to capture sound outside of the pen (environment sound). A processor in the pen may be configured to record the captured sound synchronously with other data, e.g. positions. Such a pen may allow coupling of recorded sound to recorded handwritten notes, e.g. as described in U.S. Pat. No. 6,665,490.

The captured environment sound may be of poor quality, due to of writing noise. Such writing noise may include click sounds due to stylus movement and scraping noise due to friction between the stylus tip and on the product surface. Such writing noise may be reduced by operating noise reduction algorithms, implemented by software and/or hardware, on the resulting sound track.

The effectiveness of such noise reduction may be improved by synchronously recording two sound tracks, one containing writing noise and the other containing environment sound and writing noise. Noise reduction is also feasible if both sound tracks contain environment sound and writing noise.

Thus, instead of one dual-purpose microphone, the pen may contain two microphones 120, 126. Of these microphones, one may be dedicated to capturing writing noise and the other to capturing environment sound, or both microphones may be equally dedicated to capturing both environment sound and writing noise. The output signals from the microphones 120, 126 may be received by the controller 124 which generates and stores two synchronizable sound tracks.

In a camera pen (cfr FIG. 2), it is conceivable to improve the above arrangement by combining the analysis of vibration data with an analysis of images captured by the pen camera 2'. Such a combination is simple to implement for pen up detection, since the camera 2' is activated following pen down to provide images that can be analyzed for pen up detection. For example, pen up may be indicated only if confirmed by both vibration data and image data. Such image data may comprise at least one of an image magnification, an object distance, an average surface area of code symbols in the image and a number count of code symbols in the image.

Image data may similarly be used to improve on pen down detection. However, this will require the camera 2' to be active when the pen is lifted from the surface S. To limit power consumption, it is conceivable to set the lifted pen in a low power mode with the camera operating at a reduced image frame rate, whereas a pen down causes the pen to enter a normal power mode with the camera operating at a normal image frame rate.

Pen Cap Functionality

It is known for an electronic pen to receive a cap on its front end. If the pen has a writing tip at the front end, the cap may serve to prevent ink from being inadvertently dispensed, e.g. when the pen is carried in a pocket of the user. If the pen has a data reader at the front end, e.g. a camera, the cap may serve to protect any reader components exposed at the front end of pen.

It may be desirable to provide other accessories to an electronic pen. However, from a user's perspective, it is difficult to know when to bring them along. Most likely, they are not available when needed.

It is therefore proposed to incorporate any such accessory functions into the protective cap, since this cap is likely to be carried together with the pen.

Figure 17A:
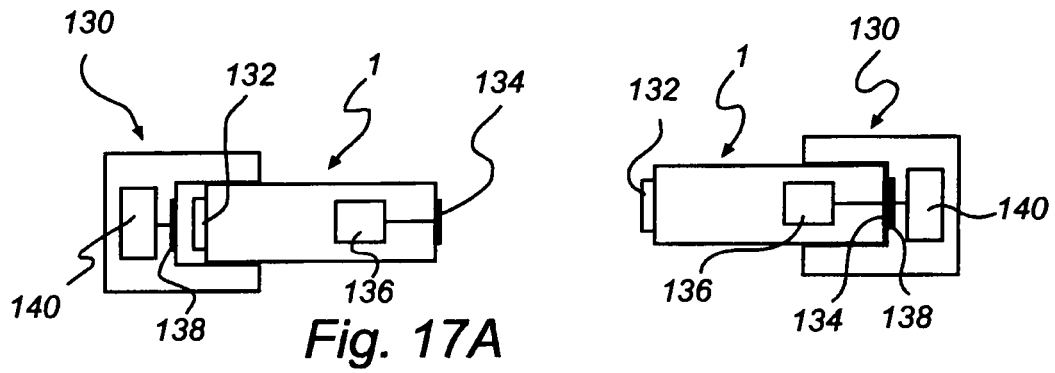
FIGS. 17A-17C are plan views to illustrate different ways of engaging a cap with an electronic pen, to provide an accessory function or supply a consumable to the pen.
Figure 17A:
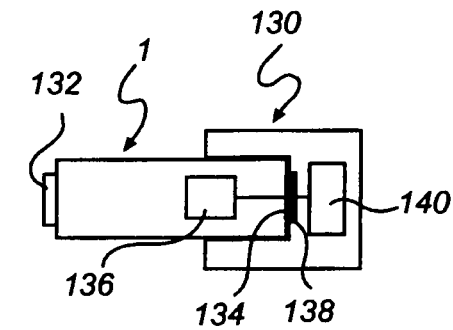
Figure 17B:
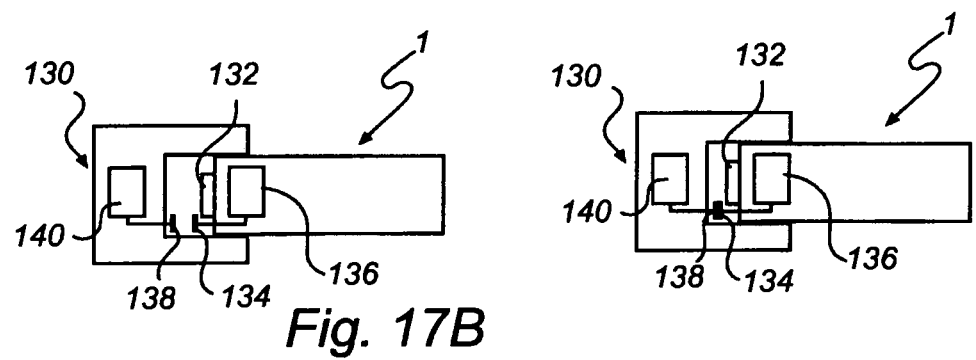
Figure 17C:
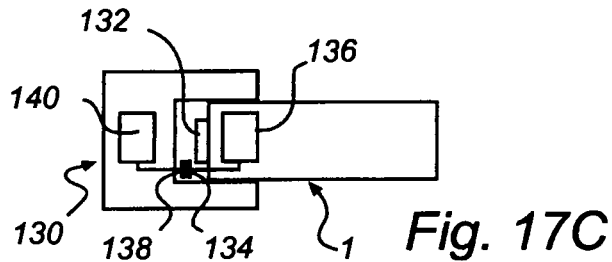

FIGS. 17A-17C illustrate different ways of manipulating a cap 130 to provide an accessory function to the pen 1. In all figures, the pen 1 has a front end implement 132, such as a stylus and/or a data reader, and a mechanical and/or electrical interface 134 which is connected to an internal resource 136 of the pen. The cap 130 has a corresponding interface 138 connected to an accessory 140 mounted in the cap. The cap interface 138 is arranged inside the cap to connect with the pen interface 134 when the cap 130 is engaged with the pen body.

In FIG. 17A, the cap 130 has a purely protective function when mounted on the pen front end (left), and an additional accessory function when mounted on the pen distal end opposite to the pen front end (right).

In FIG. 17B, the cap 130 has a purely protective function when mounted in a first, extended position on the pen front end (left), and an additional accessory function when mounted in a second position with the pen front end further inserted into the cap (right). The cap 130 and pen 1 may be provided with cooperating engagement elements (not shown) to define the first and second positions. Such engagement elements may include screw threads, releasable snap couplings, bayonet couplings, etc. For example, the cap 130 may be screwed into position, or it may be pushed/drawn into position.

In FIG. 17C, the cap 130 has only one position in which it serves both to protect the pen front end and to provide the additional accessory function.

Now follows examples of different accessory functions serving to transfer a consumable from the cap 130 to the pen 1.

The cap 130 may contain a power supply for supplying power to an internal power source of the pen 1. Specifically, the cap accessory 140 may include a battery or a micro fuel cell, for powering a rechargeable battery in the pen. Alternatively, the cap accessory 140 may comprise a fuel container for supplying fuel (e.g. hydrogen, methanol, propane, etc) to an internal micro fuel cell inside the pen 1. In another variant, the cap accessory 140 may comprise a mains connector, optionally together with a power converter, for supplying charging power to a rechargeable battery in the pen 1. In a still further variant, the pen does not contain any power source, but instead receives power from the power supply arranged in the cap.

Aforesaid micro fuel cell may be based on any available or future technology, such as DMFC (Direct-Methanol Fuel Cell), PEM (Proton Exchange Membrane), PS (Porous Silicon), SOFC (Solid Oxide Fuel Cell), etc.

In another embodiment, the cap accessory 140 may include an ink container for supplying writing ink to a writing implement in the pen 1. This writing implement may comprise an ink chamber inside the pen and a writing tip in fluid communication with the ink chamber. In such an embodiment, the cap may include a mechanism for mechanically driving the writing ink from the cap's ink container into the pen ink chamber, or the writing ink could be transferred by the action of gravity, e.g. by orienting the pen such that the ink flows from the cap into the pen.

Figure 18A:
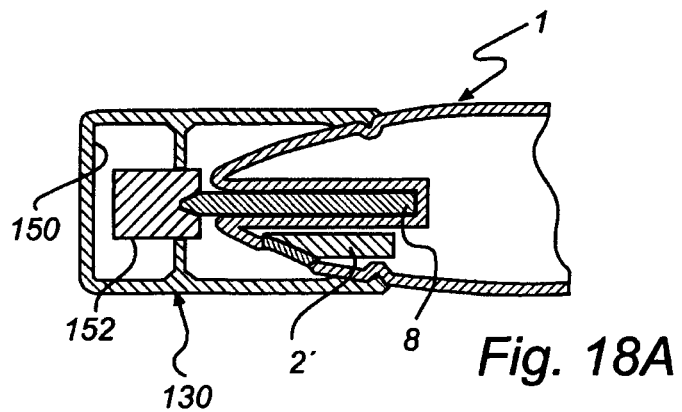
FIG. 18A is a section view of a cap-pen arrangement for supplying ink to the pen.

FIG. 18A illustrates an embodiment which is designed to draw ink from the cap 130 to a writing implement 8 primarily by capillary action. Such capillary action occurs when adhesive intermolecular forces between the ink and a substance are stronger than cohesive intermolecular forces inside the ink In the context of the present application, however, "capillary action" is intended to also include diffusion. The cap 130 incorporates an ink container 150, and a capillary element 152 which is arranged in an opening of the container 150 to be brought into contact with the tip of the writing implement 8. The external end of the capillary element 152 may or may not be shaped to mate with the tip. The capillary element 152 is made of a suitable capillary and/or porous solid material that will automatically draw ink out of the container 150. Non-limiting examples of such a material includes foam rubber and felt, although the skilled person may certainly find numerous materials that exhibit the required property. In FIG. 18A, the external end of capillary element 152 is brought into contact with the tip by placing the cap 130 on the pen's 1 front end. The ink contained in the capillary element 152 will, to the extent that the amount of ink is low in the writing implement 8, be transferred via the tip into the writing implement 8, by capillary action, possibly supplemented by action of gravity. The writing tip can be of any suitable type, such as a ball point, a felt tip, a fountain pen tip, etc.

In a variant, the capillary element dispensed with, i.e. the tip of the writing implement 8 is directly engaged with the opening of the ink container 150. A one-way valve (not shown) may be arranged over the opening, allowing the tip to enter the container 150 and automatically sealing off the opening when the tip is retracted therefrom. Any suitable one-way valve may be used, e.g. so-called syringe or septum valves used in the medical field. The skilled person will readily find alternative one-way valves to be used.

In one implementation of these embodiments, the tip is brought into contact with the ink in the cap 130 whenever the cap 130 is placed on the front end of the pen 1 (cfr. FIG. 17C). Thereby, the ink replenishment is carried out automatically and transparently to the user.

In the following, a description is given of different accessory functions serving instead to extend the functionality of the pen 1, with reference to FIGS. 18B-18G. It is to be understood that only parts deemed important for the explanation are included in the drawings, and thus the pen/cap may contain further components as described above with reference to FIGS. 1-2.

In one embodiment, schematically shown in FIG. 18B, the cap accessory includes a radiation source 160, which is powered by the pen's internal power source 7, via the pen-cap interface 134, 138. The radiation source 160 may output collimated visible radiation, thereby potentially being usable as a remote pointing device similar to a laser pointer. The radiation source 160 may alternatively output diverging visible radiation, thereby being usable as a flashlight/torch.

In another embodiment, schematically shown in FIG. 18C, the cap accessory comprises a camera 162, including imaging optics and a radiation sensor (not shown). The cap camera 162 may be powered by the pen's internal power source 7, via the pen-cap interface 134, 138. The cap 130 may furthermore include an exterior connector 163 for transferring captured images, or data derived therefrom, to an external device, such as a PC, PDA, mobile phone, etc. Alternatively, this resulting data may be transferred from the cap 130 to the pen 1 via the pen-cap interface 134, 138. It is also conceivable that the cap 130 contains a power source 166 for the camera 162, which thus need not be powered by the pen's power source 7. The cap 130 may further include a push button 168, or other manual actuator, triggering the cap camera 162 to capture an image. The camera cap 130 may be used with an electronic pen without built-in camera, or it may be used together with a camera pen. The camera functionality provided by the cap 130 may include a near-field ability to read certain machine-readable codes or printed text matter, or a far-field ability to take photographs.

In yet another embodiment, schematically shown in FIG. 18D, the cap accessory includes an optical system 170, including one or more optical components, such as lens, aperture stop, radiation filter, etc. The optical system 170 is designed to mate with a pen camera 2', in order to modify its imaging capability. For example, the cap 130 may be placed on the pen's front end with its optical system 170 in alignment with the pen camera's imaging system 12, so as to change the field of view, focal length, depth of field and/or wavelength sensitivity of the pen camera. By mounting the cap 130, a pen designed for reading a particular type of machine-readable code may be adapted to read a different type of machine-readable code, e.g. where the different codes require different field of views. The cap 130 may likewise enable conversion of a code-reading pen to a text-scanning pen, and vice versa. The cap 130 may also provide a code-reading pen with far-field optics, suitable for photography. The pen may further include a cap sensor 171 for sensing when the cap 130 is mounted in an operative position on the pen's front end. The output signal of such a cap sensor 171 may cause a processor 5 in the pen to switch between different algorithms for processing the images captured by the pen camera 2'.

In still another embodiment, schematically shown in FIG. 18E, the cap accessory includes data processing circuitry 172, which is capable of receiving images, or data derived therefrom, from the pen via the pen-cap interface 134, 138. The data processing may thus be distributed between the electronic pen 1 and the cap 130. In one extreme, all or essentially all data processing may be executed by the circuitry 172 in the cap, with the pen 1 itself lacking a processor or having a low-end processor 5. This makes it possible to provide a camera pen which captures and transfers image data to the cap circuitry 172 for processing and analysis, e.g. identification and decoding of code symbols. Alternatively, the pen processor 5 may be configured to pre-process the images, e.g. to identify the code symbols, whereas decoding of the identified code symbols, and subsequent processing of decoded data, is carried out by the cap circuitry 172 based on the thus-identified code symbols.

One potentially weak point of a camera pen is its optics, which may be quite sensitive to dust, moisture and dirt. If used in demanding or hostile environments, a camera pen may have a limited lifetime. By locating all or some processing power in the cap, the replacement cost may be reduced, since it is possible to retain the cap 130 and discard only a failing camera pen 1. Clearly, cost savings are improved for every electronic component that is arranged in the cap 130 instead of in the pen 1. For example, the cap 130 may also include a memory 174 for storage of decoded data, with the added advantage that decoded data may be retained even if the camera pen 1 is replaced. Further, with major data processing being carried out in the cap 130, one and the same camera pen 1 may be used with different cap versions, each cap version providing its own set of processing hardware and/or software. A camera pen 1 may thus be "physically upgraded" by replacing one cap 130 for another.

In another embodiment, schematically shown in FIG. 18F, the cap accessory includes a non-volatile memory 176, which receives images, or data derived therefrom, from the pen 1 via the pen-cap interface 134, 138, and optionally returns data back to the pen via this interface 134, 138. The cap 130 may furthermore include an exterior connector 178 for transferring received images, or data derived therefrom, to an external device, such as a PC, PDA, mobile phone, etc. Thus, the cap 130 may provide additional data storage capacity to the pen 1, or even act as a mobile data carrier for transferring data from the pen 1 to an external device. In one extreme, the pen 1 has no built-in non-volatile storage capacity of its own. In another example, the cap accessory includes a receiver for a removable memory unit in form of a card or a cartridge of any known type, such as SD card, CF card, SmartMedia card, MMC, Memory Stick, etc. Such a removable memory unit may form the cap memory 176, or be part thereof.

In a further embodiment, schematically shown in FIG. 18G, the cap accessory includes a transmitter or transceiver 180 for communicating wirelessly with an external device D. When the cap 130 is mounted on the pen, the transmitter/transceiver is accessible to the pen processor 5 via the pen-cap interface 134, 138. Thereby, the cap 130 provides the possibility of extending the communication ability of the pen 1. The cap 130 may also include a conversion device 182 adapted to convert data received from the pen processor 5 in compliance to one or more communication protocols and/or to convert data received from the external device D to a format that can be interpreted by the pen processor 5.

It is to be understood the above embodiments can be combined in any desired fashion. For example, the cap may contain any combination of a radiation source, a camera, an optical system, data processing circuitry, a non-volatile memory and a transmitter/transceiver.

The invention claimed is:

1. An optical component for a camera pen, the component having the shape of a plate and comprising at least two non-overlapping radiation-transmitting sections including an imaging section and an illuminating section that are formed side-by-side on a common substrate, the imaging section being configured to transmit an image of an object plane to an image plane of the imaging section, and the illuminating section being configured to transmit illuminating radiation from an emitter of radiation towards the object plane, wherein the component is of one-piece construction and comprises an image-forming surface lens structure and an aperture stop to form the imaging section, and a beam-shaping surface lens structure which is designed to shape or redirect the beam of illumination radiation from the emitter to form the illuminating section.

2. The optical component of claim 1, wherein the imaging section further comprises a radiation filter.

3. The optical component of claim 1, further comprising a stray light shield which is configured to prevent stray radiation from being transmitted through the imaging section.

4. The optical component claim 1, further comprising a plate substrate provided with passive optical elements to form the imaging and illuminating sections.

5. The optical component of claim 1, wherein the image-forming surface lens structure is formed in a surface layer of the plate substrate.

6. The optical component of claim 1, wherein the aperture stop is defined by an opening in a non-transmissive coating on the plate substrate opposite to the image-forming lens structure.

7. The optical component of claim 1, further comprising a stray light shield which is formed as non-transmissive coating applied to said plate substrate in the imaging section, said coating being arranged to define an opening in alignment with the image-forming lens structure and the aperture stop.

8. The optical component of claim 5, wherein the beam-shaping lens structure is formed in a surface layer of the illuminating section.

9. The optical component of claim 5, wherein said surface layer is a resin layer applied to the plate substrate and cured after being formed with said image-forming lens structure.

10. The optical component of claim 5, wherein the imaging section further comprises a radiation filter which is formed as a selectively transmissive coating applied to the plate substrate.

11. The optical component of claim 5, wherein the imaging section further comprises a radiation filter dispersed in the plate substrate.

12. A wafer structure comprising an optical component for a camera pen, the component having the shape of a plate and comprising at least two non-overlapping radiation-transmitting sections including an imaging section and an illuminating section that are formed side-by-side on a common substrate, the imaging section being configured to transmit an image of an object plane to an image plane of the imaging section, and the illuminating section being configured to transmit illuminating radiation from an emitter of radiation towards the object plane, wherein the component is of one-piece construction and comprises an image-forming surface lens structure and an aperture stop to form the imaging section, and a beam-shaping surface lens structure which is designed to shape or redirect the beam of illumination radiation from the emitter to form the illuminating section.

13. A camera pen comprising an optical component for a camera pen, the component having the shape of a plate and comprising at least two non-overlapping radiation-transmitting sections including an imaging section and an illuminating section that are formed side-by-side on a common substrate, the imaging section being configured to transmit an image of an object plane to an image plane of the imaging section, and the illuminating section being configured to transmit illuminating radiation from an emitter of radiation towards the object plane, wherein the component is of one-piece construction and comprises an image-forming surface lens structure and an aperture stop to form the imaging section, and a beam-shaping surface lens structure which is designed to shape or redirect the beam of illumination radiation from the emitter to form the illuminating section.

14. The camera pen of claim 13, further comprising a housing installed in the pen, the housing comprising a first mounting structure for the optical component, a second mounting structure for an image sensor configured to detect said image, and a third mounting structure for a radiation source configured to generate the illuminating radiation.

15. The camera pen of claim 14, wherein the first mounting structure is located in a front portion of the housing, and the second mounting structure is located in a rear portion of the housing.

16. The camera pen of claim 14, further comprising an elongate guide pipe for receiving a stylus, the guide pipe being received in and joined to an elongate recess in an exterior wall portion of the housing.

17. The camera pen of claim 14, wherein the housing comprises a locating structure in the recess, the locating structure being configured to engage with an end surface of the guide pipe.

18. The camera pen of claim 14, wherein the recess is formed in a bottom wall portion of the housing so as to space the center axis of the guide from a geometric plane containing the imaging and illuminating compartments.

19. The camera pen of claim 15, wherein the housing comprises an interior wall portion which extends between said front and rear portions to separate the housing into an imaging compartment and an illuminating compartment, and wherein the first mounting structure is configured to locate the optical component with its imaging section mating with the imaging compartment and its illuminating section mating with the illuminating compartment.

20. The camera pen of claim 18, wherein the imaging and illuminating compartments open into a top face of the housing.

* * * * *